United States Patent
Miller

(10) Patent No.: US 8,022,781 B2
(45) Date of Patent: Sep. 20, 2011

(54) REDUNDANCY SYSTEM FOR A TELECOMMUNICATION SYSTEM AND RELATED METHODS

(75) Inventor: Richard M. Miller, Gilbert, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 676 days.

(21) Appl. No.: 12/194,485

(22) Filed: Aug. 19, 2008

(65) Prior Publication Data

US 2008/0310550 A1   Dec. 18, 2008

Related U.S. Application Data

(60) Provisional application No. 60/957,978, filed on Aug. 24, 2007.

(51) Int. Cl.
*H03C 3/00* (2006.01)
(52) U.S. Cl. ....... 332/103; 329/304; 455/63.1; 455/139; 455/278.1; 455/450; 375/299; 375/359
(58) Field of Classification Search .................. 375/299, 375/359; 455/63.1, 139, 278.1, 450; 332/103; 329/304; 370/498
See application file for complete search history.

(56) References Cited

U.S. PATENT DOCUMENTS 7,228,104 B2   6/2007   Collins et al.

OTHER PUBLICATIONS

National Semiconductor, DS36C278, "Low Power Multipoint EIA-RS-485 Transceiver", Jul. 1998.

*Primary Examiner* — Arnold Kinkead
(74) *Attorney, Agent, or Firm* — Booth Udall, PLC

(57) ABSTRACT

A redundancy system for a co-channel telecommunication system and related methods. Implementations of the redundancy system may include at least a first modulator and a second modulator having a symbol mapper coupled to a parallel bit signal. The symbol mapper may be configured to route each of a plurality of parallel bits received through the parallel bit signal to a plurality of significant bit signals. In a first implementation, a plurality of significant bit signal multiplexers may be used to switch the plurality of parallel bit signals to allow the first and second modulators to operate in either a redundant or operating mode. In a second implementation, a premapped symbol (PMSI) encoder and a PMSI decoder may be used to transmit the plurality of significant bit signals across an interface bus as a real dual-data rate (DDR) signal and an imaginary DDR signal.

15 Claims, 6 Drawing Sheets

US 8,022,781 B2

REDUNDANCY SYSTEM FOR A TELECOMMUNICATION SYSTEM AND RELATED METHODS

CROSS REFERENCE TO RELATED APPLICATIONS

This document claims the benefit of the filing date of U.S. Provisional Patent Application 60/957,978 entitled "Redundancy Protection for Communications System Employing Co-Channel Interference Cancellation" to Richard M. Miller which was filed on Aug. 24, 2007, the disclosure of which is hereby incorporated entirely herein by reference.

BACKGROUND

1. Technical Field

Aspects of this document relate generally to telecommunication systems.

2. Background Art

Conventional telecommunication systems transmit signals across wired and wireless communication channels. The signals transmitted by conventional systems may take the form of modulated electromagnetic waves traveling through a wire or through open space. In various conventional communication systems, the amplitude and/or frequency of the electromagnetic signals may be altered or modulated to aid in data transmission. Many conventional telecommunication systems receiving modulated electromagnetic signals include a demodulator which receives the incoming signal and collects the data being transmitted by using various signal processing methods. In addition, many systems also include a modulator which receives data to be transmitted and translates the data into corresponding modulated electromagnetic signals.

In satellite telecommunication systems, to prevent system downtime and the breaking of the telecommunication link, redundant components, such as modems are often employed. The redundant modem is kept powered on and ready to operate should a problem with the operating modem be detected. In co-channel telecommunication systems, where the modem is engaged in receiving a combined signal containing a signal of interest and an interfering signal and canceling the interfering signal from the combined signal to retrieve the signal of interest, maintaining the readiness of the redundant modem generally requires that the redundant modem receive a real-time copy of the interfering signal from the operating modem. Conventionally, this has been done by using analog multiplexers and an radio frequency (RF) switching box that enables an RF copy of the interfering signal to be sent to the redundant modem.

SUMMARY

Implementations of co-channel telecommunication systems may utilize a first implementation of a redundancy system. The redundancy system may include at least a first modulator and a second modulator. The first modulator and the second modulator may each include a symbol mapper coupled to a parallel bit signal and include a symbol timing clock. The symbol mapper may be configured to route each of a plurality of parallel bits received through the parallel bit signal to a plurality of significant bit signals. A plurality of significant bit signal multiplexers may be coupled with the plurality of significant bit signals, each having a first input, a second input, and an output. The output of each of the significant bit signal multiplexers may be configured to correspond with either the first input or the second input. The redundancy system may further include a transmit symbol timing circuit coupled with the symbol timing clock in the symbol mapper of the first modulator and the symbol timing clock in the symbol mapper of the second modulator. The plurality of significant bit signal multiplexers of the first modulator and of the second modulator may be coupled together through a switching circuit. The switching circuit may be configured to switch the correspondence of the output of each of the plurality of significant bit signal multiplexers from the first input to the second input in response to a redundancy switching signal.

Implementations of a first implementation of a redundancy system may include one, all, or some of the following:

The plurality of significant bit signals may further include at least a real most significant bit ($I_{MSB}$) signal, a real least significant bit ($I_{LSB}$) signal, an imaginary most significant bit ($Q_{MSB}$) signal, and an imaginary least significant bit ($Q_{LSB}$) signal.

The plurality of significant bit signal multiplexers may further include a first $I_{MSB}$ multiplexer coupled with the $I_{MSB}$ signal of the first modulator at a first input and with the $I_{MSB}$ signal of the second modulator at a second input, a first $I_{LSB}$ multiplexer coupled with the $I_{LSB}$ signal of the first modulator at a first input and with the $I_{LSB}$ signal of the second modulator at a second input, a first $Q_{MSB}$ multiplexer coupled with the $Q_{MSB}$ signal of the first modulator at a first input and with the $Q_{MSB}$ signal of the second modulator at a second input, a first $Q_{LSB}$ multiplexer coupled with the $Q_{LSB}$ signal of the first modulator at a first input and with the $Q_{LSB}$ signal of the second modulator at a second input, a second $I_{MSB}$ multiplexer coupled with the $I_{MSB}$ signal of the second modulator at a first input and with the $I_{MSB}$ signal of the first modulator at a second input, a second $I_{LSB}$ multiplexer coupled with the $I_{LSB}$ signal of the second modulator at a first input and with the $I_{LSB}$ signal of the first modulator at a second input, a second $Q_{MSB}$ multiplexer coupled with the $Q_{MSB}$ signal of the second modulator at a first input and with the $Q_{MSB}$ signal of the first modulator at a second input, and a second $Q_{LSB}$ multiplexer coupled with the $Q_{LSB}$ signal of the second modulator at a first input and with the $Q_{LSB}$ signal of the first modulator at a second input.

The outputs of the plurality of significant bit signal multiplexers may be coupled with a plurality of stored waveform filters.

The plurality of significant bit signal multiplexers and the transmit symbol timing circuit may be coupled together with an interface bus.

The interface bus may be a premapped symbol interface (PMSI) bus.

The interface bus may be an EIA-485 interface bus.

Implementations of co-channel telecommunication systems may utilize a second implementation of a redundancy system. The redundancy system may include at least a first modulator and a second modulator. The first modulator and the second modulator may each include a symbol mapper coupled to a parallel bit signal. The symbol mapper may include a symbol timing clock and may be configured to route each of a plurality of parallel bits received through the parallel bit signal to a plurality of significant bit signals. A premapped symbol interface (PMSI) encoder may be included that is configured to receive the plurality of significant bit signals and encode them into a real double-data rate (DDR) signal and an imaginary DDR system. A PMSI decoder may also be included that is configured to receive the real DDR signal and the imaginary DDR signal and decode them into the plurality of significant bit signals. The redundancy system may further include a transmit symbol timing circuit coupled with the symbol timing clock in the symbol mapper of the first modulator and the symbol mapper of the second modulator. The PMSI encoder, the PMSI decoder, and the transmit symbol timing circuit may be coupled together through an interface bus.

Implementations of a second implementation of a redundancy system may include one, all, or some of the following.

The interface bus may be an EIA-485 interface bus.

The PMSI decoder may be coupled to a plurality of stored waveform filters.

Implementations of redundancy systems may utilize implementations of a method of providing redundancy for a telecommunications system. The method may include sending a first signal to a satellite with a first modulator and receiving a combined signal from the satellite with a second modulator using an interface bus. The combined signal may include the first signal and the second signal. The method may further include sending a copy of the first signal to the second modulator using the interface bus and cancelling the first signal from the combined signal with the second modulator to produce the second signal using the copy of the first signal. The method may include sending a copy of the received combined signal to at least one redundant modulator using the interface bus and sending a premapped symbol interface (PMSI) signal to the redundant modulator using the interface bus. The PMSI signal may correspond with a copy of the first signal and include a plurality of significant bit signals. The method may further include cancelling the first signal from the copy of the received combined signal with the redundant modulator using the PMSI signal to produce the second signal and at least one modulator performance metric and transmitting the at least one modulator performance metric to an external evaluation module.

Implementations of a method of providing redundancy for a telecommunications system may include one, all, or some of the following.

The method may include exchanging the operation of the second modulator with the operation of the redundant modulator by sending the copy of the first signal to the redundant modulator using the interface bus, receiving the combined signal with the redundant modulator, and cancelling the first signal from the combined signal with the redundant modulator to produce the second signal. The method may also include sending the PMSI signal to the second modulator using the interface bus, sending a copy of the received combined signal to the second modulator using the interface bus, and cancelling the first signal from a copy of the combined signal with the second modulator using the PMSI signal to produce the second signal and the at least one modulator performance metric.

The method may include exchanging the operation of the first modulator with the operation of the redundant modulator by sending the first signal to the satellite using the redundant modulator, sending the PMSI signal to the first modulator using the interface bus, sending a copy of the received combined signal to the first modulator using the interface bus, and canceling the first signal from a copy of the combined signal with the first modulator using the PMSI signal to produce the second signal and the at least one modulator performance metric.

The interface bus may be an EIA-485 interface bus.

Sending the PMSI signal using the interface bus may include encoding the plurality of significant bit signals with a PMSI encoder to produce a real DDR signal and an imaginary DDR signal and decoding the real DDR signal and the imaginary DDR signal using a PMSI decoder.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended redundancy system and related methods and/or assembly procedures for a redundancy system and related methods will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such redundancy systems, method implementations, and implementing components, consistent with the intended operation.

Figure 1:
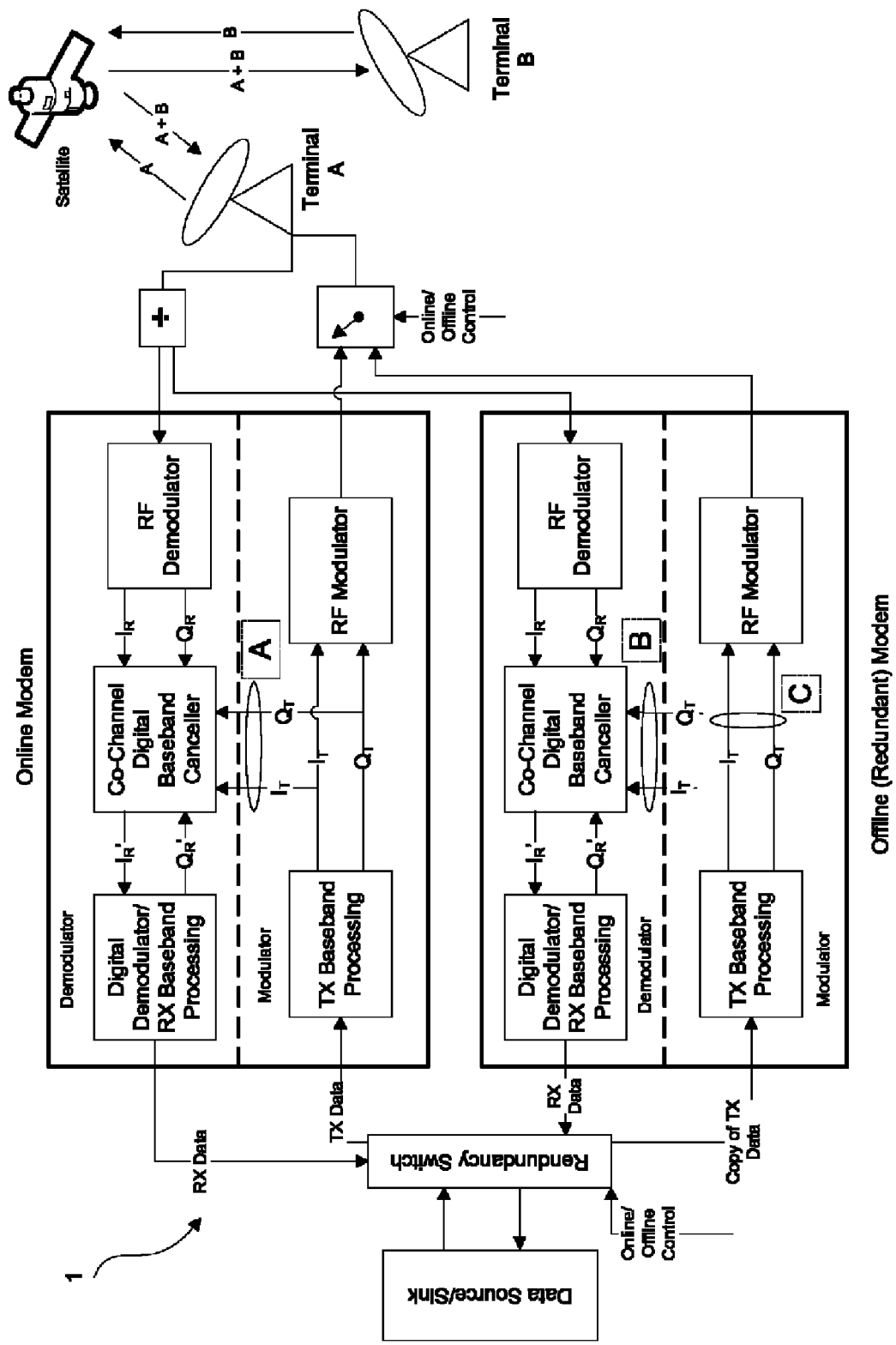
FIG. 1 is a diagram of an online and redundant modem employed in a co-channel satellite telecommunication system.

Referring to FIG. 1, an implementation of a co-channel telecommunications system 1 is illustrated. As illustrated, the co-channel telecommunications system 1 may include an online modem and one or more offline modems that are present to serve as redundant modems. As illustrated, each modem may include a demodulator portion and a modulator portion; the demodulator portion processes received signals, while the modulator portion processed transmitted signals. The modems illustrated in FIG. 1 are configured to receive a combined signal containing at least one signal of interest and an interfering signal and to cancel the interfering signal from the combined signal to retrieve the at least one signal of interest. As illustrated, this cancellation may take place when both the signal of interest and the interfering signal are digital baseband signals.

As indicated in FIG. 1, the signal of interest at Terminal A may be signal B, the signal being transmitted by Terminal B. Because the telecommunications link is a full duplex co-channel link, signal A and signal B, once received by the satellite, are additively combined and retransmitted to both Terminals A and B on the same channel as the combined signal A+B. Because of this, both Terminals A and B will be required to cancel their own outbound transmitted signal from the received combined signal A+B in order to retrieve their respective signals of interest (signal A or signal B). Because each terminal's transmitted signal (either signal A or signal B) is subsequently received as the interfering signal in the combined signal A+B, the interfering signal is time-delayed and may be frequency shifted relative to the original transmitted signal. One of the functions of the Co-Channel Digital Baseband Cancellers in the modems associated with Terminal A or B is to compensate for that time-delay and frequency offset in order to successfully cancel the interfering signal. Relevant details of the process of performing time delay and frequency offset correction may be found in U.S. Pat. Nos. 7,228,104 to Collins et al., entitled "Adaptive Canceller for Frequency Reuse Systems" issued Jun. 5, 2007 and 6,859,641 to Collins et al. with the same title, issued Feb. 22, 2005, both owned by Applied Signal Technology, Inc. of Sunnyvale, Calif., USA, the disclosures of which are hereby incorporated herein by reference.

As indicated in FIG. 1, to provide a copy of the transmitted signal, the digital baseband real signal $I_T$ and the digital baseband imaginary signal $Q_T$ are sent to the Co-Channel Digital Baseband Canceller, and are used to cancel the copy of the transmitted signal coming back from the satellite as the interfering signal. The location of these two signals is indicated by position A on the figure. Because the redundant modem is not transmitting, however, it has no copy of the transmitted signal to use to perform interfering signal cancellation. Conventional solutions of providing the redundant modem with an analog or RF copy of the transmitted signal required the use of an RF/analog switch box which generally was large and expensive. In addition, because the signals were being switched in analog or RF form, signal quality and integrity issues may result when analog/RF switching is utilized. For the redundant modem, the best process for providing a copy of the transmitted signal may occur when the signals at position A are provided at position B inside the redundant modem, while allowing switching of the signals to the signals indicated at position C when the redundant modem is required to begin operating in online mode.

Figure 2:
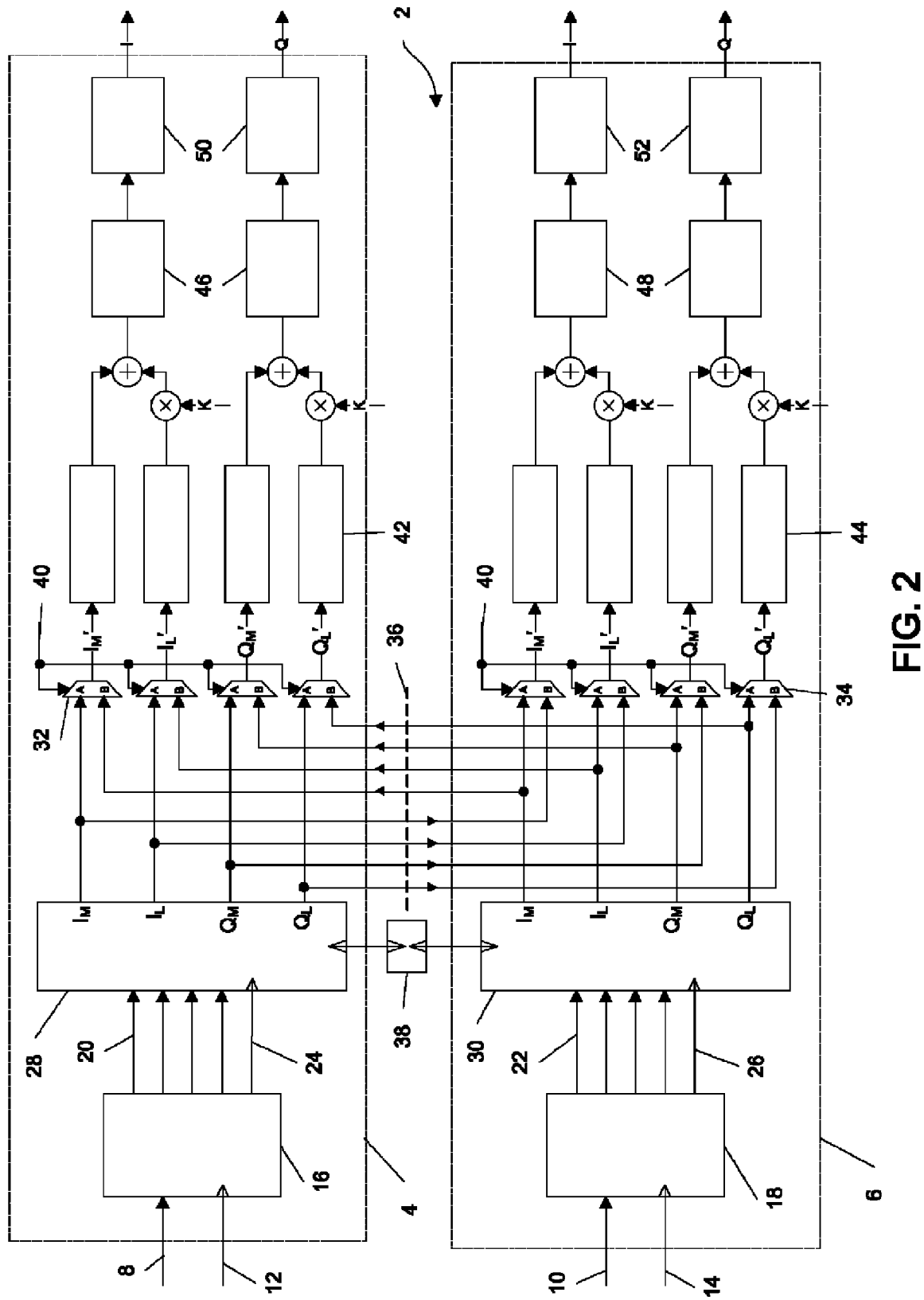
FIG. 2 is a block diagram of a first implementation of a redundancy system.

Referring to FIG. 2, a first implementation of a redundancy system for a telecommunications system 2 is illustrated that provides for transmitting of and switching of the required signals in digital baseband form. As illustrated, the co-channel telecommunications system 2 may include a first modulator 4 and a second modulator 6, which are located in two different modems. Referring to FIG. 1, the first modulator 4 may be located in the online modem while the second modulator 6 may be located in the redundant modem. While the implementation of a redundancy system 2 illustrated in FIG. 2 includes only two modulators 4, 6, other implementations of redundancy systems may include any number of modulators located in any number of modems, depending upon system requirements. Both the first modulator 4 and the second modulator 6 may be configured to receive a serial data signal on signal lines 8, 10 and a bit clock signal on signal lines 12, 14 coupled with a serial to parallel converter 16, 18. The serial to parallel converter 16, 18 receives serial bits on the serial data signal lines 8, 10, converts them to parallel bits to transmit on one or more parallel bit signal lines 20, 22, and outputs a parallel bit clock signal on signal lines 24, 26 to a symbol mapper 28, 30. The symbol mapper 28, 30 receives the parallel bits in the parallel bit signal lines 20, 22 and maps them into real and imaginary signals according to a predetermined symbol pattern.

The output of the symbol mapping process utilized by the symbol mapper 28, 30 is a plurality of significant bit signals, which in the implementation illustrated in FIG. 2, may be a real most significant bit ($I_{MSB}$) signal, a real least significant bit ($I_{LSB}$) signal, an imaginary most significant bit ($Q_{MSB}$) signal, and an imaginary least significant bit ($Q_{LSB}$) signal. The redundancy system implementation 2 illustrated in FIG. 2 is configured for a 16-ary symbol process and includes four significant bit signals. In other implementations of redundancy systems, other modulation schemes of order higher than 4 may be utilized (provided the orders are powers of two) and the number of the significant bit signals adjusted accordingly. For example, in a 32-ary symbol process, the number of resulting significant bit signals would be six.

As illustrated in FIG. 2, the plurality of significant bit signals associated with the first modulator 4 are split and coupled to the second modulator 6 at the inputs of a plurality of significant bit signal multiplexers 34 associated with the second modulator 6, forming a premapped symbol interface (PMSI) signal. The plurality of significant bit signals associated with the second modulator 6 are also split and are coupled to the first modulator 4 at the inputs of a plurality of significant bit signal multiplexers 32 associated with the first modulator. In the implementation illustrated in FIG. 2, the significant bit signals from the first modulator 4 are coupled at the inputs labeled B of the significant bit signal multiplexers 34; the significant bit signals from the second modulator 6 are also coupled at the inputs labeled B of the significant bit signal multiplexers 32. The plurality of significant bit signals associated with the first modulator 4 are coupled at the inputs labeled A of the significant bit signal multiplexers 32; likewise, the plurality of significant bit signals associated with the second modulator 6 are also coupled at the inputs labeled A of the significant bit signal multiplexers.

The sets of four signals that contain split copies of the plurality of significant bit signals associated with the first modulator 4 and the second modulator 6 may be sent or transmitted using an interface bus 36. By non-limiting example, the interface bus may be a PMSI interface bus; an EIA-485 interface bus like that described in U.S. Pat. No. 6,480,029 to Morgan et al. entitled "Three-Volt TIA/EIA-485 Driver Circuit," issued Nov. 12, 2002, the disclosure of which is hereby incorporated herein by reference; a serial interface bus; a parallel interface bus; an Ethernet interface, a wireless interface, and any other system and/or method of transmitting digital and/or analog electromagnetic signals.

In addition to the split copies of the plurality of significant bit signals, a copy of the symbol timing signal from the symbol timing clock is sent across the interface bus 36 to a transmit symbol timing circuit 38 coupled to the first modulator 4 and the second modulator 6. The transmit symbol timing circuit 38 allows the symbol timing clock of the symbol mapper 28 of the first modulator 4 to be synchronized with the symbol timing clock of the symbol mapper 30 of the second modulator 6, and vice versa. The transmit symbol timing circuit 38 may be included as part of the first modulator 4, the second modulator 6, or the interface bus 36, depending upon the particular implementation.

A switching circuit 40 coupled to an external control module is coupled with the significant bit signal multiplexers 32, 34. Each of the significant bit signal multiplexers 32, 34 is configured to change the correspondence of its output with its first or second inputs (labeled in FIG. 2 as A and B). The correspondence may be changed in response to a switching signal carried by the switching circuit 40. For example, a switching signal containing A=0 may be supplied to the switching circuit 40 at the first modulator 4, and the significant bit signal multiplexers 32 may all change the correspondence of their outputs to their second inputs. When the significant bit signal multiplexers 32 are in this configuration, the signal being output is a copy of the plurality of significant bit signals received from the second modulator 6. At the same time a switching signal containing A=0 is applied to the switching circuit 40 at the first modulator 4, a switching signal containing B=1 is applied to the switching circuit 40 at the second modulator 6, causing the signal multiplexers 34 to change the correspondence of their outputs to their first inputs. When the significant bit signal multiplexers 34 are in this configuration, the signal being output is the plurality of significant bit signals from the symbol mapper 30 associated with the second modulator 6.

When the first modulator 4 and second modulator 6 are in the above described configuration, when A=0 and B=1, the first modulator 4 can be said to be in the redundant status, or acting as a redundant modulator, since the first modulator 4 is receiving the plurality of significant bit signals (or PMSI signal) from the symbol mapper 30 of the second modulator 6 rather than from its own symbol mapper 28. When the transmit symbol clock circuit 38 is used to synchronize the symbol clock of the first modulator 4 to the symbol clock of the second modulator 6, the first modulator 4 may operate redundantly to, or, as a copy of the second modulator 6. Because of this, the performance of the first modulator 4 can be measured to see if it is 1) operating like the second modulator 6 and/or 2) operating in compliance with various modulator performance standards. Any of a wide variety of modulator performance metrics used to measure the performance of the second modulator 6 can now be generated using the PMSI signal and can be sent to, and evaluated using an external evaluation module for the first modulator 4. Accordingly, the operational health and capability of the first modulator 4 operating as a redundant modulator can be assessed and monitored just like the operating second modulator 6. Because the redundant modulator may be continuously monitored, the odds of it being available in the event of a modulator failure are much higher, thus reducing system downtime.

This property of the redundancy system 2 may be useful when operational problems with the operating second modulator 6 are noted from the modulator performance metrics by the evaluation module. In these cases, provided the modulator performance metrics of the redundant first modulator 4 indicate the unit is satisfactory, the redundancy system implementation 2 can exchange the operation of the second modulator 6 with the operation of the redundant first modulator 4. In particular implementations, this may be accomplished by supplying a switching signal containing B=1 to the switching circuit 40 at the first module 4 and a switching signal containing A=0 to the second module 6, thereby reversing the correspondence of the first and second inputs to the outputs of the significant bit signal multiplexers 32, 34. In this way, the PMSI signal is now being sent from the first modulator 4 to the second modulator 6. When the transmit symbol timing circuit 38 synchronizes the symbol clock in the symbol mapper 30 with the symbol clock in the symbol mapper 28, the second modulator 6 is now in a redundant status or operating as a redundant modulator. If there are significant issues with the second modulator 6, it may now be taken offline for repair or troubleshooting.

The foregoing discussion of the operation of the redundancy system 2 applies when the operating modulator (either the first modulator 4 or the second modulator 6) is in sending or receiving mode. When the operating modulator is in sending mode, the modulator sends transmitted signal to a satellite. When the operating modulator is in receiving mode, the modulator may be receiving a combined signal containing the transmitted signal (now an interfering signal) and a signal of interest from the satellite. As has been previously discussed at length, such a situation exists in a satellite telecommunication system utilizing the Doubletalk™ principles disclosed in U.S. Pat. No. 7,228,104 to Collins et al., previously incorporated herein by reference. In implementations of telecommunication systems employing implementations of redundancy systems, the PMSI signal is be the interfering signal used for cancellation In implementations like the one illustrated in FIG. 2, where it is the PMSI signal that is being transferred between the redundant and operating modulators, only five lines are required to send the copy of the first signal for cancellation. This result contrasts with what would be required if the copy of the first signal were sent as copies of the ultimate outputs of the first and second modulators 4, 6. The ultimate outputs of each of the first and second modulators 4, 6 are two low-pass filtered analog signals, one for the real portion of the data and one for the imaginary. To route such an analog signal conventionally requires expensive and complex RF switching equipment, including an RF switch box. Transferring a copy of the first signal as a PMSI signal reduces the potential number of lines required for the transfer and the need to use more expensive analog-capable system components. A detailed discussion of various conventional options for transferring a copy of the first signal is also included in U.S. Provisional Application No. 60/957,978 to Richard M. Miller, which was previously incorporated by reference.

The ultimate outputs of the first and second modulators may be created by sending the significant bit signals from the outputs of the significant bit signal multiplexers 32, 34 through a plurality of stored waveform filters 42, 44 coupled to the significant bit signal multiplexers 32, 34. The stored waveform filters perform Nyquist filtering of the data symbols producing filtered signals in wide parallel data format. In the implementation illustrated in FIG. 2, the least significant bit signal of both the real and imaginary significant bit signals are multiplied by a constant K and then summed with their respective most significant bit signal. In various implementations, K may be 0 for binary phase shift keyed (BPSK) or quadrature phase shift keyed signals, 0.5 for 16-quadrature amplitude modulated (16-QAM) or 8-QAM signals, and 0.414 for 8-phase shift keyed (8-PSK) signals. When other than 16-ary implementations are used, the number of parallel bit signals supplied to the symbol mappers will vary accordingly: for BPSK, 1 output will result; for QPSK, 2 outputs will result; for 8-PSK and 8-QAM, 3 outputs will result; and for 16-QAM, 4 outputs result. The single output for BPSK is the result of the observation that for BPSK generally, I=Q.

Once the real and imaginary filtered signals have been produced, each is passed through a digital-to-analog converter (DAC) 46, 48 and then sent to a low pass filter 50, 52 in preparation for sending to an RF modulator. Once modulated, the signals can be used in performing the cancellation of the first signal from the combined signal.

Figure 3:
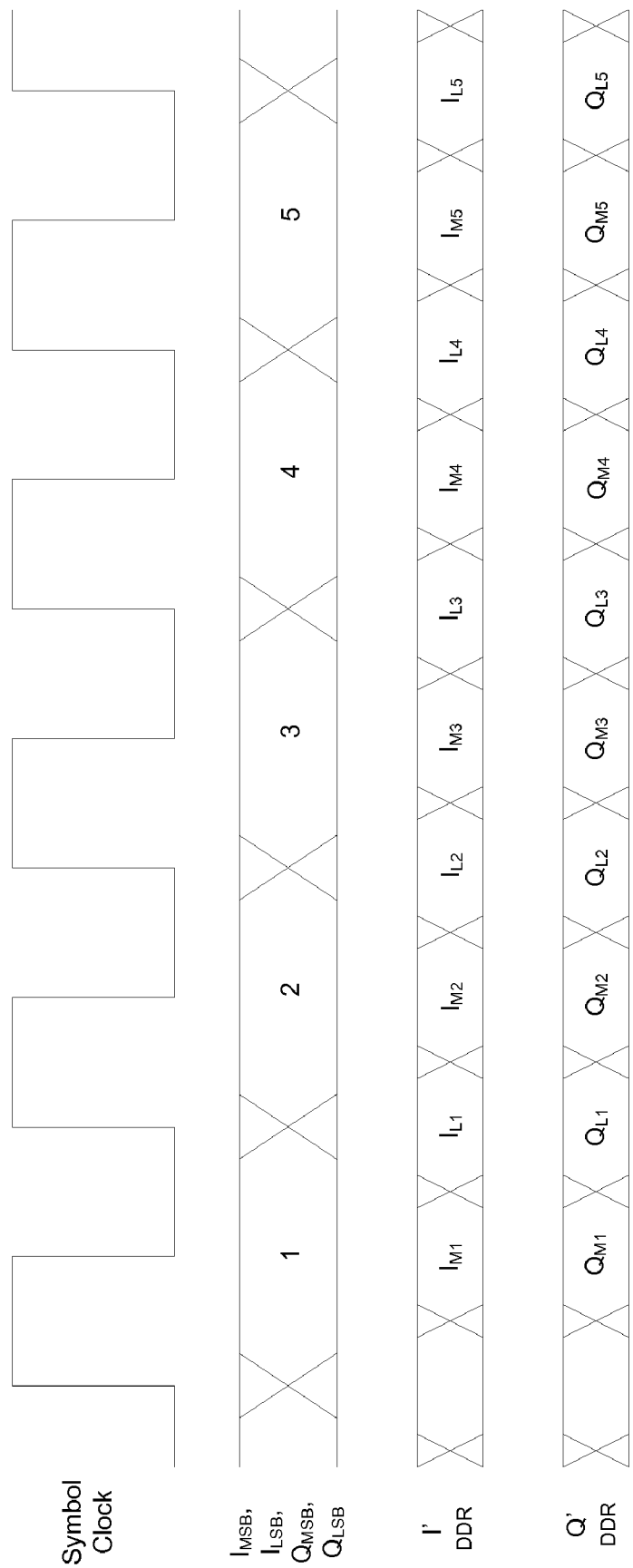
FIG. 3 is a signal mapping diagram of an implementation of a dual data rate (DDR) signal for implementations of a redundancy system.
Figure 4:
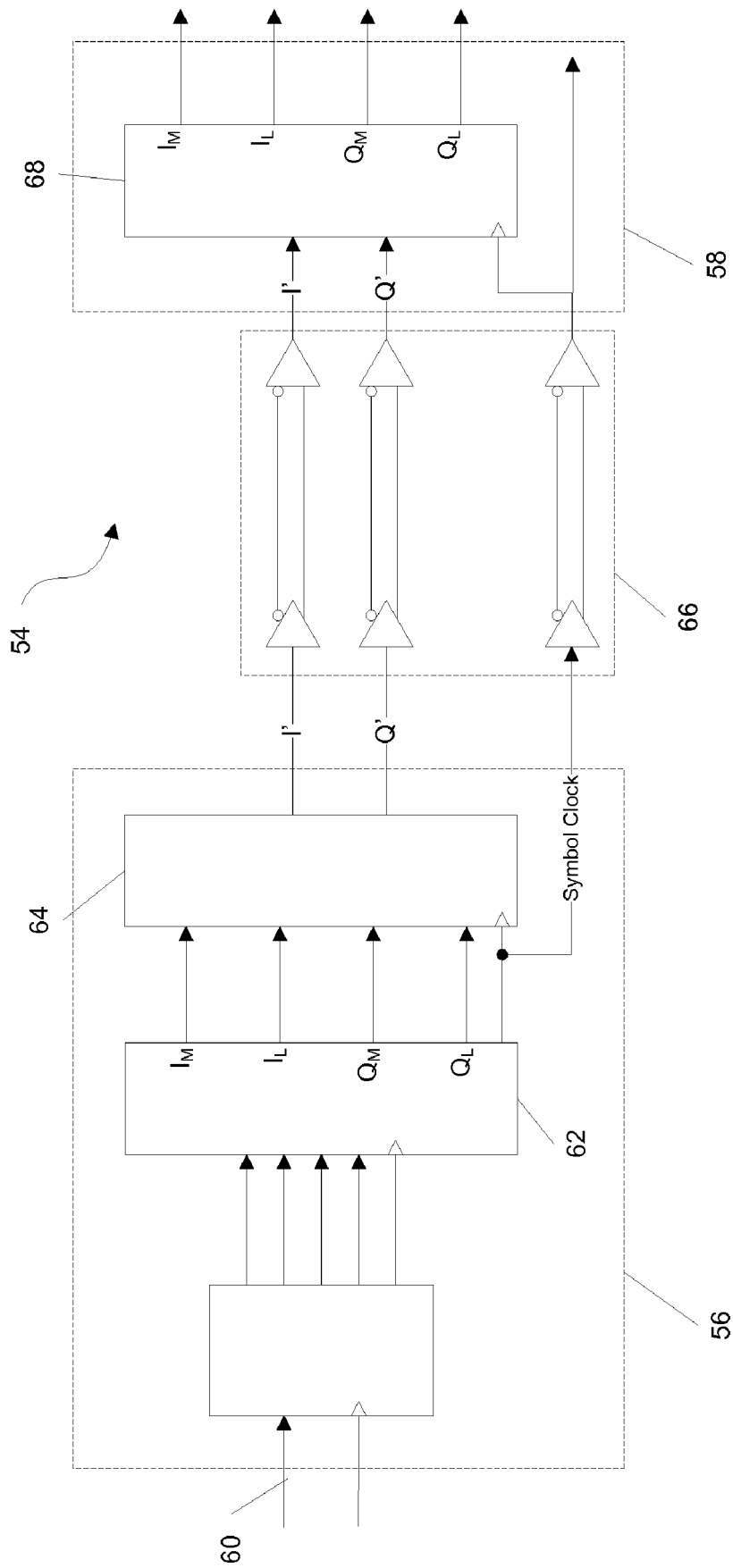
FIG. 4 is a block diagram of a second implementation of a redundancy system.

Referring to FIG. 4, another implementation of a redundancy system for a telecommunication system 54 is illustrated. What is illustrated in FIG. 4 is a portion of the first modulator 56 and the second modulator 58. The portion shown includes the serial signal input 60 configured to carry a serial signal to the symbol mapper 62 section, all of which is configured like the modulators previously illustrated in FIG. 2. Instead of being coupled with a plurality of significant bit multiplexers, however, the implementation illustrated in FIG. 4 includes a PMSI encoder 64 which receives the plurality of significant bit signals from the symbol mapper 62. The PMSI encoder 64 is configured to take the significant bit signals and encode them on the rising and falling edges of the symbol clock using a dual-data rate (DDR) process. FIG. 3 is an illustration of how the real and imaginary signals for a 16-ary implementation are encoded in the time domain. The resulting encoded real DDR (I') signal and imaginary DDR (Q') signal, along with a symbol clock signal are then transmitted using an interface bus 66. The symbol clock signal may or may not be carried and/or process by a transmit symbol timing circuit, depending on the implementation of the redundancy system 54. As was previously discussed, a wide variety of interface bus types could be utilized to communicate the real DDR and imaginary DDR signals. The implementation of a redundancy system 54 illustrated in FIG. 4 includes an EIA-485 interface, as indicated by the standard shorthand schematic symbols used to show the interface.

Once the real DDR and imaginary DDR signals have been sent over the interface bus 66, they are received by a PMSI decoder 68. The PMSI decoder 68 then reverses the DDR process to produce the original significant bit signals once again, which can then be sent to the stored waveform filters for processing. Depending upon the implementation, the PMSI decoder 68 can also perform PMSI encoding, allowing the first modulator 56 and the second modulator 58 to alternate between encoding and decoding activities and, therefore, from the operating to the redundant state. A switching circuit may be incorporated in the PMSI encoder 64 and PMSI decoder 68 to allow them to be changed from encoding to decoding mode.

Because the plurality of significant bit signals are encoded into a real DDR and imaginary DDR signal with the PMSI encoder 64, only three lines are required to send a copy of the first signal to the redundant modulator for the implementation illustrated in FIG. 4. This represents a reduction over the five lines used to transmit the copy of the first signal used in the implementation illustrated in FIG. 2. Use of an EIA-485 interface bus in combination with the PMSI encoder 64 and PMSI decoder 66 may further allow for increases in system bandwidth and capability, since commercial EIA-485 interface bus implementations can currently transmit at 30 Mbps over several tens of meters. Implementations utilizing PMSI encoders and EIA-485 interface buses may result in systems with greater flexibility, capacity, and robustness at lower costs. Relevant additional disclosure regarding the structure and function of EIA-485 interfaces may be found in the patent to Morgan et al. previously incorporated by reference and in a publication by National Semiconductor Corporation entitled "DS36C278 Low Power Multipoint EIA-RS-485 Transceiver," dated July 1998, the disclosure of which is hereby incorporated herein by reference.

Figure 5:
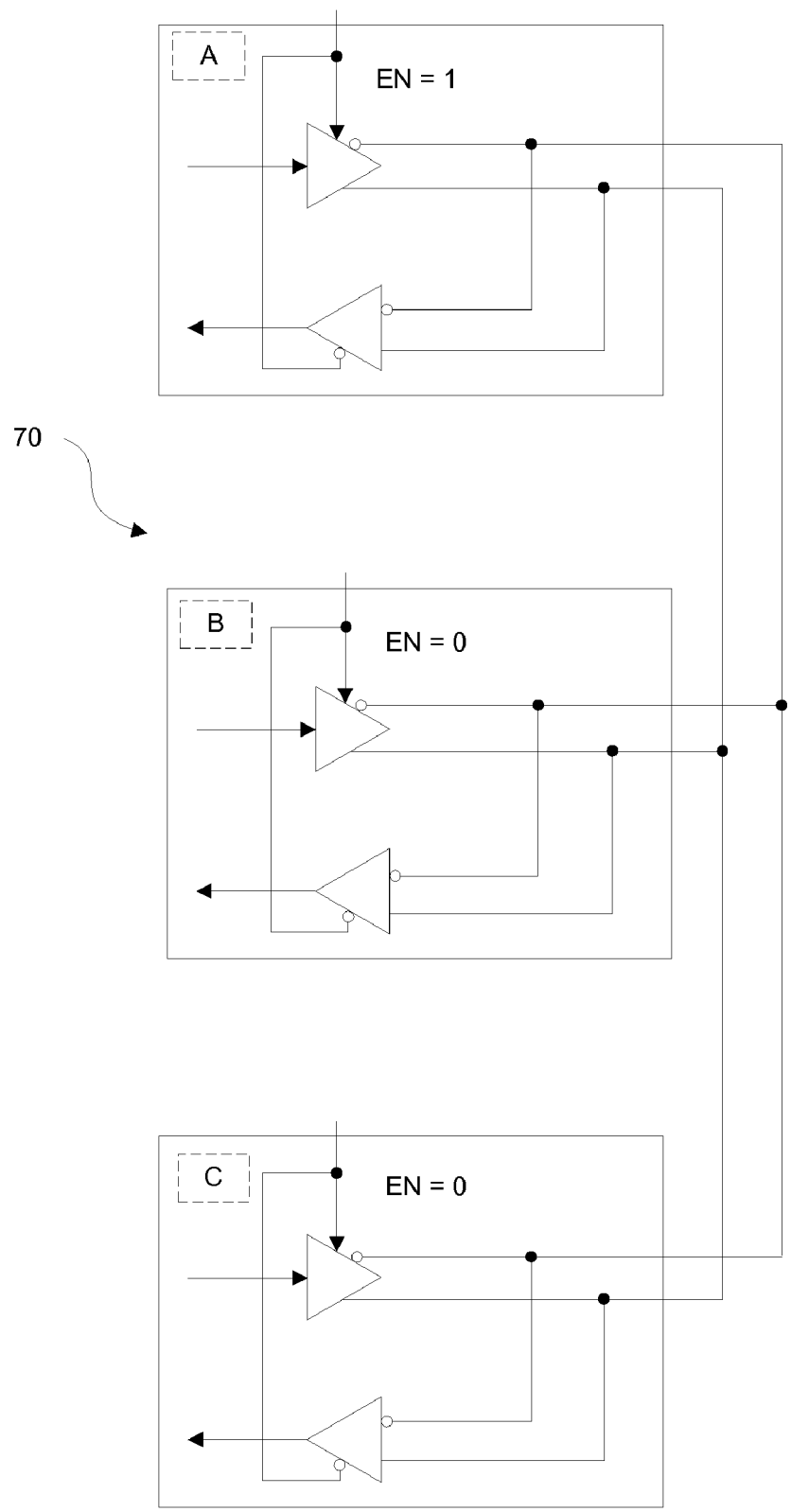
FIG. 5 is a block diagram of an implementation of a redundancy system including a modified EIA-485 signal transmission system.

Referring to FIG. 5, an implementation of a redundancy system for a telecommunication system 70 is illustrated. As illustrated, the redundancy system 70 includes three modulators, A, B, and C. The portion of each of the three modulators A, B, C illustrated is the interface bus section, which in the modulators illustrated, is an EIA-485 interface bus. A PMSI signal can be introduced at each of the modulators and a PMSI signal from any two of the three modulators can be received by any one of the modulators as indicated by the arrow entering the topmost triangle and exiting the bottommost triangle of each modulator circuit. According to the EIA-485 standard, the EIA-485 interface bus illustrated allows only one of the modulators to "talk" or transmit at a time; accordingly, only one of the three modulators A, B, or C could be transmitting a first signal to a satellite at any given time. For example, modulator A (a first modulator) is set to talk by sending a switching signal containing EN=1.

According to the EIA-485 standard, all of the rest of the modulators could be listening to either a copy of the first signal or a PMSI signal corresponding to the first signal as the transmitting or sending modulator is working. In the implementation illustrated in FIG. 5, this is accomplished by sending a switching signal containing EN=0 for modulators B and A. One of the listening modulators could be receiving the combined signal containing the first signal and the second signal and performing the cancellation to produce the second signal. In the illustrated implementation, modulator B (a second modulator) is performing this function. The other listening modulator could be receiving the PMSI signal and a copy of the combined signal and producing the second signal and at least one modulator performance metric to be sent to an evaluation module. In the implementation illustrated in FIG. 5, modulator C (a third modulator) is operating as a redundant modulator. Because of the ability of the interface bus to permit multiple modulators to listen simultaneously, each of the modulators A, B, C can change operation while allowing for the operation of any one of them as a redundant modulator. In addition, the modulator operating as a redundant modulator can be monitored by the external evaluation module. Implementations of redundancy systems 70 may utilize standard EIA-485 interface bus designs or modified EIA-485 interface bus designs to allow the modulators to operate in sending (transmitting), receiving, and redundancy mode. Further disclosure regarding the structure and operation of EIA-485 interface bus designs can be found in U.S. Pat. No. 6,480,029 to Morgan et al., the disclosure of which was previously incorporated herein by reference.

Figure 6:
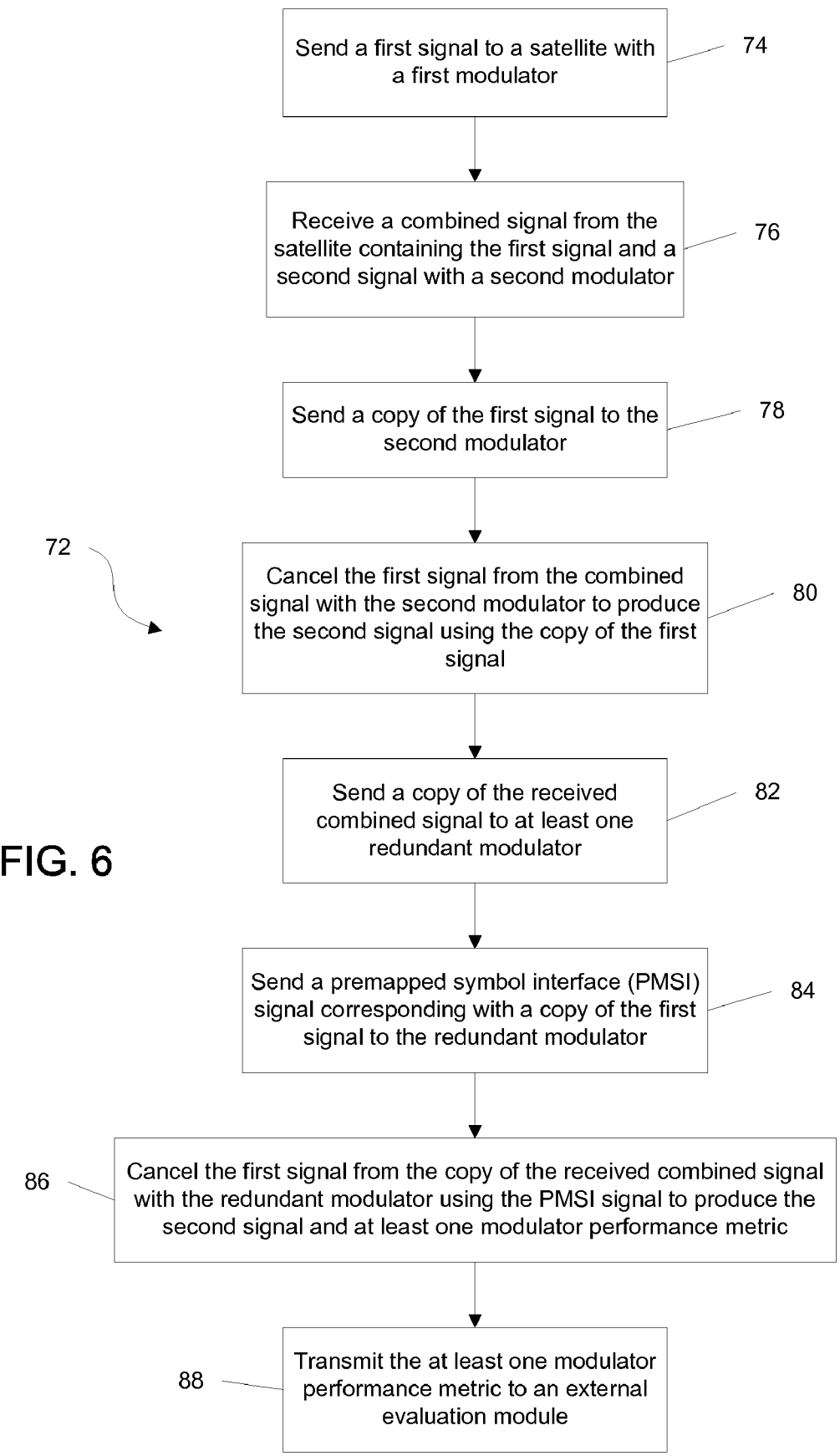
FIG. 6 is a flowchart of the method steps of an implementation of a method of providing redundancy for a telecommunications system.

Referring to FIG. 6, an implementation of a method of operating a redundancy system 72 is illustrated. Implementations of the method may be utilized by implementations of redundancy systems 2, 54, 70, and in particular by implementations that include three or more modulators. As illustrated, the method may include sending a first signal to a satellite with a first modulator (step 74), receiving a combined signal from the satellite containing the first signal and a second signal with a second modulator (step 76), and sending a copy of the first signal to the second modulator (step 78). The second signal may be a desired signal because it originates from a remote location in communication with the satellite and contains data needed for the telecommunication link. The copy of the first signal may be sent in, by non-limiting example, analog, digital, serial, parallel, symbol, PMSI, or any other electromagnetic format capable of communicating the desired data.

Implementations of the method 72 further include canceling the first signal from the combined signal with the second modulator to produce the second signal using the copy of the first signal (step 80), and sending a copy of the received combined signal to at least one redundant modulator (step 82. The method 72 may also include sending a premapped symbol interface (PMSI) signal corresponding with a copy of the first signal to the redundant modulator (step 84) and canceling the first signal from the coy of the received combined signal with the redundant modulator using the PMSI signal to produce the second signal and at least one modulator performance metric (step 86). The method may also include transmitting the at least one modulator performance metric to an external evaluation module (step 88). As was previously discussed, the steps of sending may involve sending the signals in any of a wide variety of formats.

Implementations of the method 72 may also allow the exchanging of the operation of the various modulators. In the case when the sending modulator (first modulator) is exchanged with the redundant modulator, the method 72 may include sending the first signal to the satellite using the redundant modulator and sending the PMSI signal to the first modulator using the interface bus, because the first modulator is now acting as the redundant modulator. The method 72 may further include sending a copy of the combined signal received by the second modulator to the first modulator using the interface bus and canceling the first signal from a copy of the combined signal using the PMSI signal to produce the second signal and the at least one modulator performance metric. The copy of the first signal, the PMSI signal, and the copy of the received combined signal (combined signal) utilized in various implementations of the method 72 may generally be sent from any one of the modulators (except that the modulator sending to the satellite does not receive the combined signal and therefore cannot send a copy of the combined signal).

In the case where the operation of the redundant modulator and the receiving modulator are exchanged, the method 72 may include sending the copy of the first signal to the redundant modulator using the interface bus, receiving the combined signal with the redundant modulator, and cancelling the first signal from the combined signal with the redundant modulator to produce the second signal, because the redundant modulator is now acting as the receiving modulator. The method 72 may further include sending the PMSI signal to the second modulator using the interface bus, sending a copy of the received combined signal to the second modulator using the interface bus, and canceling the first signal from a copy of the combined signal using the PMSI signal to produce the second signal and at least one modulator performance metric.

In cases where the exchanging of operation of the modulators is occasioned by the failure of the modulator performing the sending or receiving operation, the steps of the method 72 that would correspond to the failed modulator may be omitted depending on the remaining functionality of the failed modulator. In addition, in particular implementations of the method 72, sending the PMSI signal using the interface bus may further include encoding the plurality of significant bit signals with a PMSI encoder to produce a real DDR signal and an imaginary DDR signal as well as decoding the real DDR signal and the imaginary DDR signal using a PMSI encoder to create the plurality of significant bit signals.

In places where the description above refers to particular implementations of redundancy systems and methods of operating redundancy systems, it should be readily apparent that a number of modifications may be made without departing from the spirit thereof and that these implementations may be applied to other redundancy system and method implementations.

The invention claimed is:

1. A redundancy system for a co-channel telecommunications system, the redundancy system comprising:
   at least a first modulator and a second modulator, the first modulator and the second modulator each comprising:
   a symbol mapper coupled to a parallel bit signal, the symbol mapper comprising a symbol timing clock and configured to route each of a plurality of parallel bits received through the parallel bit signal to a plurality of significant bit signals; and
   a plurality of significant bit signal multiplexers coupled with the plurality of significant bit signals, each of the significant bit signal multiplexers comprising a first input, a second input, and an output, the output of each of the significant bit signal multiplexers configured to correspond with either the first input or the second input; and
   the redundancy system further comprising a transmit symbol timing circuit coupled with the symbol timing clock in the symbol mapper of the first modulator and the symbol timing clock in the symbol mapper of the second modulator;
   wherein the plurality of significant bit signal multiplexers of the first modulator and of the second modulator are coupled together through a switching circuit configured to switch the correspondence of the output of each of the plurality of significant bit signal multiplexers from the first input to the second input in response to a redundancy switching signal.

2. The system of claim 1, wherein the plurality of significant bit signals further comprise at least a real most significant bit ($I_{MSB}$) signal, a real least significant bit ($I_{LSB}$) signal, an imaginary most significant bit ($Q_{MSB}$) signal, and an imaginary least significant bit ($Q_{LSB}$) signal.

3. The system of claim 2, wherein the plurality of significant bit signal multiplexers further comprise:
   a first $I_{MSB}$ multiplexer coupled with the $I_{MSB}$ signal of the first modulator at a first input and with the $I_{MSB}$ signal of the second modulator at a second input;
   a first $I_{LSB}$ multiplexer coupled with the $I_{LSB}$ signal of the first modulator at a first input and with the $I_{LSB}$ signal of the second modulator at a second input;
   a first $Q_{MSB}$ multiplexer coupled with the $Q_{MSB}$ signal of the first modulator at a first input and with the $Q_{MSB}$ signal of the second modulator at a second input;
   a first $Q_{LSB}$ multiplexer coupled with the $Q_{LSB}$ signal of the first modulator at a first input and with the $Q_{LSB}$ signal of the second modulator at a second input; and
   a second $I_{MSB}$ multiplexer coupled with the $I_{MSB}$ signal of the second modulator at a first input and with the $I_{MSB}$ signal of the first modulator at a second input;
   a second $I_{LSB}$ multiplexer coupled with the $I_{LSB}$ signal of the second modulator at a first input and with the $I_{LSB}$ signal of the first modulator at a second input;
   a second $Q_{MSB}$ multiplexer coupled with the $Q_{MSB}$ signal of the second modulator at a first input and with the $Q_{MSB}$ signal of the first modulator at a second input; and
   a second $Q_{LSB}$ multiplexer coupled with the $Q_{LSB}$ signal of the second modulator at a first input and with the $Q_{LSB}$ signal of the first modulator at a second input.

4. The system of claim 1, wherein the outputs of the plurality of significant bit signal multiplexers are coupled with a plurality of stored waveform filters.

5. The system of claim 1, wherein the plurality of significant bit signal multiplexers and the transmit symbol timing circuit are coupled together with an interface bus.

6. The system of claim 5, wherein the interface bus is a premapped symbol interface (PMSI) bus.

7. The system of claim 5, wherein the interface bus is an EIA-485 interface bus.

8. A redundancy system for a co-channel telecommunications system, the redundancy system comprising:
   at least a first modulator and a second modulator, the first modulator and the second modulator each comprising:
   a symbol mapper coupled to a parallel bit signal, the symbol mapper comprising a symbol timing clock and configured to route each of a plurality of parallel bits received through the parallel bit signal to a plurality of significant bit signals;
   a premapped symbol interface (PMSI) encoder configured to receive the plurality of significant bit signals and encode them into a real double-data rate (DDR) signal and an imaginary DDR signal; and
   a PMSI decoder configured to receive the real DDR signal and the imaginary DDR signal and decode the real DDR signal and the imaginary DDR signal into the plurality of significant bit signals; and the redundancy system further comprising a transmit symbol timing circuit coupled with the symbol timing clock in the symbol mapper of the first modulator and the symbol mapper of the second modulator;

wherein the PMSI encoder, PMSI decoder, and the transmit symbol timing circuit are coupled together through an interface bus.

9. The system of claim 8, wherein the interface bus is an EIA-485 interface bus.

10. The system of claim 9, wherein the PMSI decoder is coupled to a plurality of stored waveform filters.

11. A method of providing redundancy for a co-channel telecommunications system, the method comprising:

sending a first signal to a satellite with a first modulator;

receiving a combined signal from the satellite with a second modulator using an interface bus, the combined signal comprising the first signal and a second signal;

sending a copy of the first signal to the second modulator using the interface bus;

cancelling the first signal from the combined signal with the second modulator to produce the second signal using the copy of the first signal;

sending a copy of the received combined signal to at least one redundant modulator using the interface bus;

sending a premapped symbol interface (PMSI) signal to the redundant modulator using the interface bus, the PMSI signal corresponding with a copy of the first signal and comprising a plurality of significant bit signals;

cancelling the first signal from the copy of the received combined signal with the redundant modulator using the PMSI signal to produce the second signal and at least one modulator performance metric; and transmitting the at least one modulator performance metric to an external evaluation module.

12. The method of claim 11, further comprising exchanging the operation of the second modulator with the operation of the redundant modulator by:

sending the copy of the first signal to the redundant modulator using the interface bus;

receiving the combined signal with the redundant modulator;

cancelling the first signal from the combined signal with the redundant modulator to produce the second signal;

sending the PMSI signal to the second modulator using the interface bus;

sending a copy of the received combined signal to the second modulator using the interface bus;

canceling the first signal from a copy of the combined signal with the second modulator using the PMSI signal to produce the second signal and the at least one modulator performance metric.

13. The method of claim 11, further comprising exchanging the operation of the first modulator with the operation of the redundant modulator by:

sending the first signal to the satellite using the redundant modulator;

sending the PMSI signal to the first modulator using the interface bus;

sending a copy of the received combined signal to the first modulator using the interface bus;

canceling the first signal from a copy of the combined signal with the first modulator using the PMSI signal to produce the second signal and the at least one modulator performance metric.

14. The method of claim 11, wherein the interface bus is an EIA-485 interface bus.

15. The method of claim 11, wherein sending the PMSI signal using the interface bus further comprises encoding the plurality of significant bit signals with a PMSI encoder to produce a real DDR signal and an imaginary DDR signal and decoding the real DDR signal and the imaginary DDR signal using a PMSI decoder.

* * * * *